May 26, 1936. V. J. SPRUNGER 2,041,788
MANUFACTURE OF DIPPED GOODS
Filed April 18, 1931 2 Sheets-Sheet 2
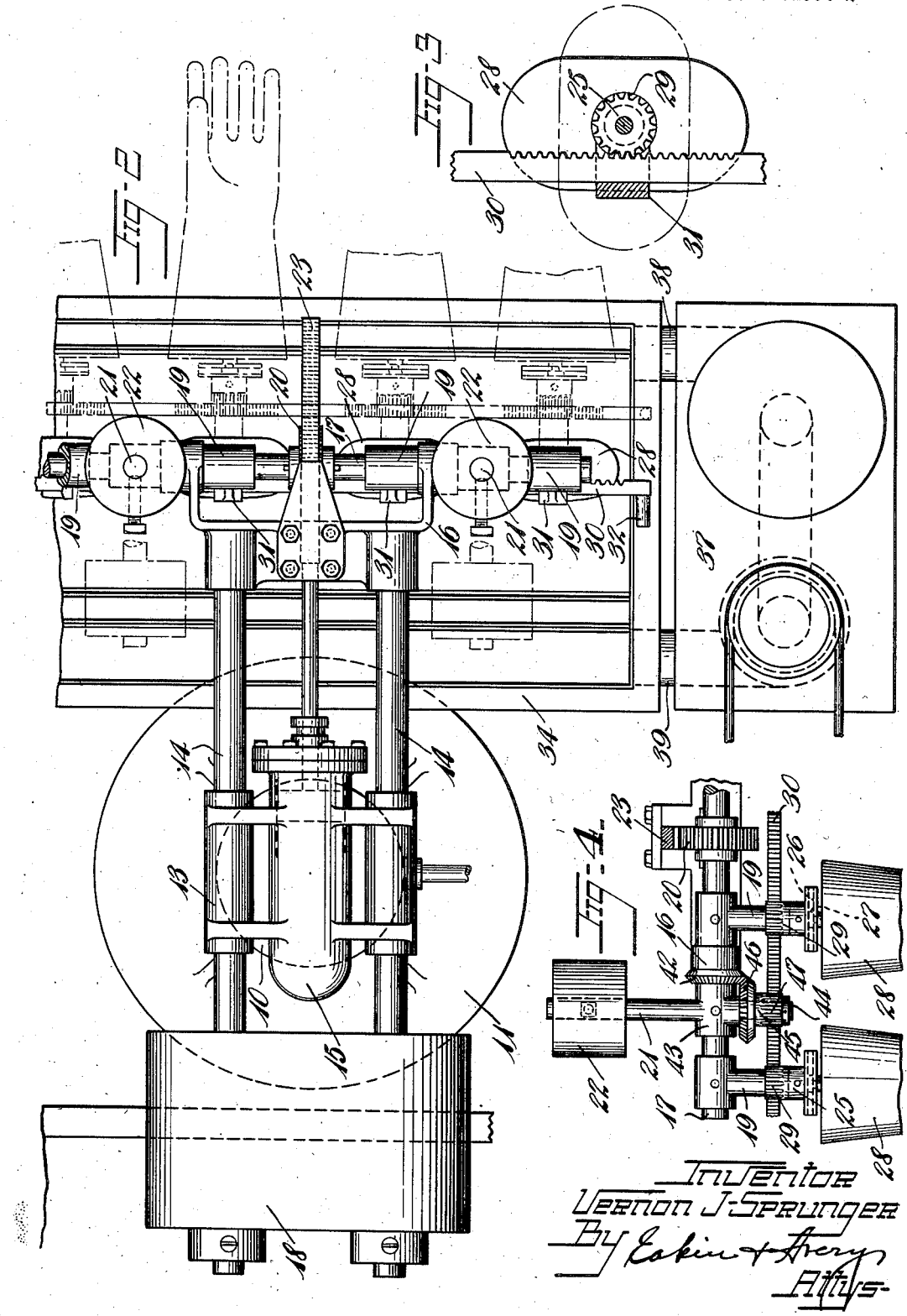

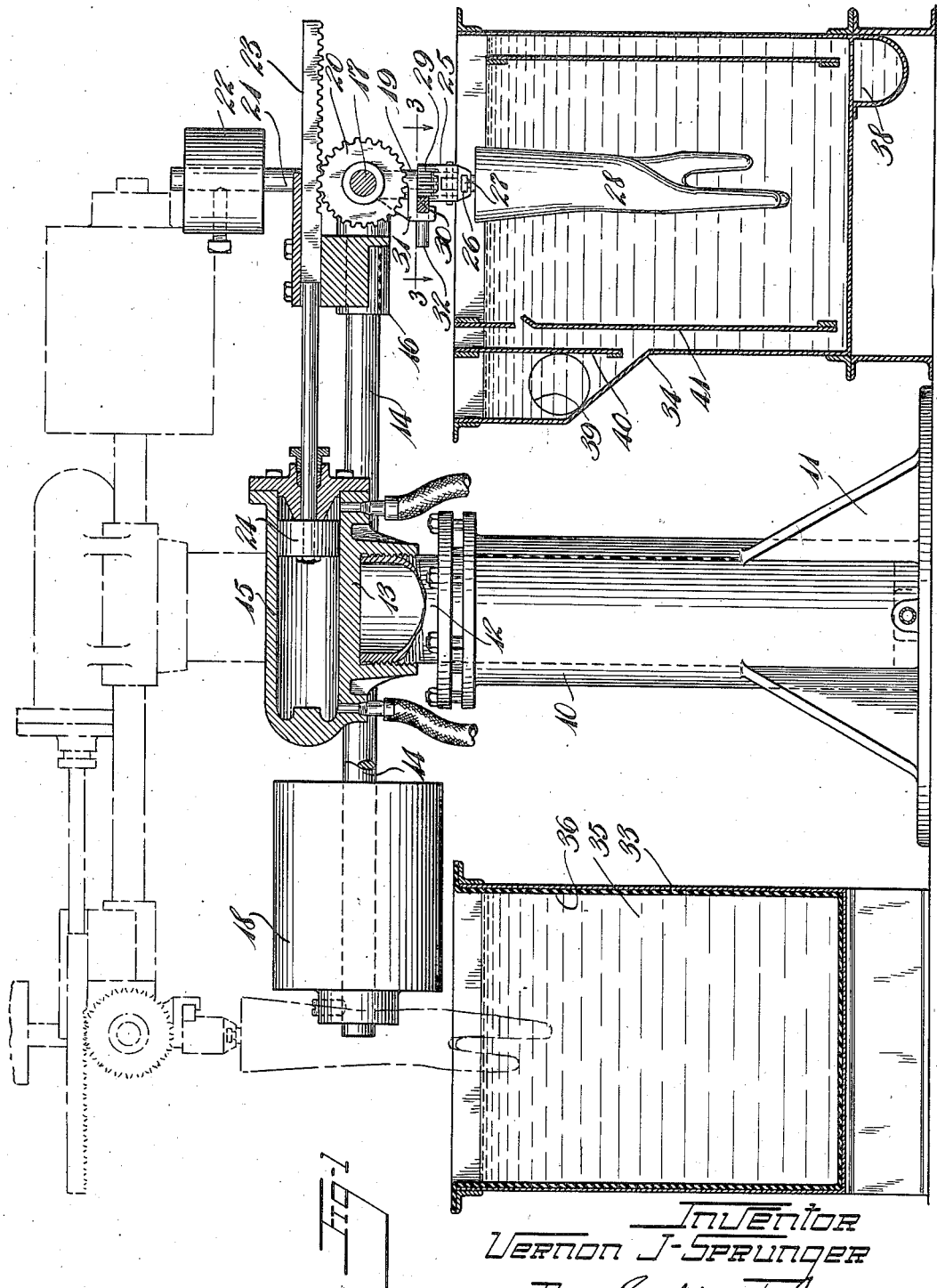

Patented May 26, 1936

2,041,788

UNITED STATES PATENT OFFICE 2,041,788

MANUFACTURE OF DIPPED GOODS

Vernon J. Sprunger, Akron, Ohio, assignor to The B. F. Goodrich Company, New York, N. Y., a corporation of New York Application April 18, 1931, Serial No. 531,248

5 Claims. (Cl. 18—24)

This invention relates to the art of manufacturing shaped rubber articles or coatings by dipping forms or objects in liquid dispersions of rubber, and particularly to the manufacture of such rubber articles by dipping forms in aqueous dispersions such as rubber latex. The chief objects of this invention accordingly include the provision of a new and improved method for the manufacture of such goods, and an apparatus for carrying out the method.

In the manufacture of rubber goods by dipping forms into latex considerable difficulty has been heretofore encountered by reason of the fact that the latex or the form as it emerges from the body of latex is sufficiently fluid to flow on the form causing irregularities in thickness, particularly locally thickened areas, which persist in the finished product and become detrimental both from the standpoint of appearance and of service. To remedy this defect it has been proposed to reduce the speed of withdrawal of the form from the latex bath to permit the excess latex to flow back off the form into the bath, but this results in a gradually thickened body of latex rubber toward the portions last to be withdrawn and locally thickened spots on the part of the form last to leave the latex bath.

The purpose of this invention is to provide a process of general applicability to the commercial manufacture of rubber goods and rubber-coated goods from latex and other liquid dispersions of like fluidity characteristics, which shall produce dried layers of substantially uniform thickness and shall prevent the formation of locally thickened areas. In brief, my invention comprises dipping a form into such a liquid dispersion of rubber and thereafter immediately on emergence of the form from its bath imparting to the form a continuous movement of a character to cause a uniform distribution of the surface film of liquid dispersion on the form.

For many products formed from concentrated latices it is found that the inversion of the form followed by a turning movement which exposes the liquid film alternately to the action of the force of gravity in opposite directions for a short period, or until the latex layer has set sufficiently to be no longer fluid, is entirely adequate to accomplish the desired uniform distribution of latex on the form. This turning movement may be either a continuous rotation about a horizontal axis or an arcuate to and fro swinging movement through a considerable vertical angle.

If, however, the latex or other liquid dispersion has a higher degree of fluidity, as when a more dilute dispersion is employed, it is frequently desirable to give to the form, in addition to the primary turning movement described above, a secondary movement of rotation about a different axis, which may be imparted simultaneously with the primary movement or alternately or periodically therewith. This secondary movement is preferably carried out about an independent movable axis approximately perpendicular to the axis of the primary turning movement, the resultant effect of the two movements being to neutralize completely any gravitational displacement of the liquid film by repeatedly changing the position of the form so as not to favor displacement in one direction materially more than in any other direction. These movements are preferably of moderate speed and substantially continuous.

This invention is applicable to the manufacture of rubber articles of the most varied nature, including rubber gloves, bath caps, tobacco pouches, nipples, finger cots, etc., and even to the permanent coating of articles of wood, metal, etc., with rubber. It will be described below with reference to a specific example, but it will be understood that it is not limited thereto.

In the accompanying drawings Fig. 1 is a side view partially in section, and Fig. 2 is a top view of an apparatus adapted for the practice of this invention, while Fig. 3 is a detailed view of a portion of the mechanism for rotating the individual forms. Fig. 4 is a detailed view illustrating a modification of the invention.

The apparatus shown in Figs. 1 and 2 contains a vertical hydraulic cylinder 10 supported on a pedestal 11. The plunger 12 carries on its top a saddle 13 embracing two supporting rods 14, 14 and a small, horizontal, double-acting hydraulic cylinder 15. At one end of the rods 14, 14 is supported a yoke 16, in which is journaled the supporting shaft 17, and at the other end an adjustable counterweight 18.

The supporting shaft 17 carries four mold-supporting arms 19, 19 and a gear wheel 20, as well as two counterweight arms 21, 21 carrying adjustable counterweights 22, 22. The gear 20 meshes with a rack 23 sliding in a channel in the yoke 16, actuated by the piston 24 of the hydraulic cylinder 15. The length of the stroke of the piston 24 is such that the rack 23 is capable of turning the gear 20 and its associated structures through exactly half a revolution.

Each of the mold-supporting arms 19, 19 carries a block 25 radially pivoted thereon, which is provided with a T slot 26 in which is fastened the stud 27 on the forms 28, 28. Each block has gear teeth 29 cut in its periphery, meshing with the teeth of a rack 30 supported by brackets 31, 31 forming parts of the respective mold-supporting arms 19, 19. An operating handle 32 is provided at each end of the rack 30, permitting a rotation of the invidiual forms 28, 28 as indicated by the broken lines of Fig. 3, by simply reciprocating the rack 30.

Dipping tanks 33 and 34 are provided adjacent to the machine in such a position that the forms 28, 28 may be immersed therein. If the dipping operation is carried out with aqueous dispersions such as latex, in conjunction with a liquid coagulant, the coagulant 35 may be placed in the tank 33, which is provided with a suitable lining 36 to prevent corrosion of the metal by the coagulant. The tank 34, containing the latex is provided with a suitable continuous circulating and screening device 37, which removes the liquid from the tank through the duct 38 and returns it at 39, whence it passes past the baffles 40 and 41 which reduce surging of the liquid.

The hydraulic cylinders are connected to a source of water under pressure through a conventional system of ducts and valves which are not shown, for convenience of illustration.

In the operation of the machine, water is admitted to the cylinder 10, raising the plunger 12 and the mechanism supported thereby. A series of clean molds, here illustrated as porcelain glove forms 28, 28, is fastened on the mold-supporting arms 19, 19 as described above, with the palms away from the center of the machine, and the machine is rotated about the plunger 12 as an axis until the forms are above the coagulant tank 33. The forms are then lowered into the coagulant, as indicated by the broken lines of Fig. 1, by draining the water from the cylinder 10, and immediately raised again until they are clear of the tank. The coagulant is distributed over the forms by introducing water alternately at each end of the horizontal cylinder 15, causing an oscillation of the forms about the shaft 17 through 180°. The manner in which the forms are swung outward and upward is indicated by the broken lines of Fig. 2. In order to assure a uniform distribution of the liquid between the front and the back of the forms, they are each turned through a half revolution each time that they come to the lower position shown in the drawings, by moving the handle 32 on the rack 30 to one side or the other, so that the forms are swung with the palms out and up one time and with the back out and up the next time, and so on alternately.

After two or three motions, or, if the coagulant is dissolved in a volatile solvent, after the major part of the solvent has evaporated, the machine is again swung around so that the forms are suspended over the latex tank 34, and the forms are lowered until they are immersed therein, as indicated by the solid lines of Fig. 1. The forms are allowed to remain in the latex until the layer of rubber coagulated on the surface of the forms has attained the desired thickness. The forms are then raised slowly out of the liquid and again oscillated as described above, while the forms are periodically reversed on their individual axes as before, until the film of latex on the surface is completely set, either by evaporation or by coagulation, or by a combination of both.

The forms with the deposited rubber thereon may then be removed from the machine, and washed, dried, and vulcanized, or otherwise treated, in the ordinary manner, and are replaced with clean forms.

In the process described above the oscillation about the axis 17 is sufficient to assure a uniform distribution of the liquid in the direction of the length of the glove, but the force of gravity acting on the glove midway of the swinging movement always in the same direction would tend to cause a displacement of the liquid toward the back of the glove, were it not for the periodical reversal of each glove neutralizing and overcoming this tendency.

The precise sequence of the operations may be changed; for example, by reversing the forms both at the top and the bottom of the major oscillation of the forms instead of only at the bottom as described above, or by reversing them even less frequently. Under some conditions it may not be found necessary to reverse them at all, or to reverse them only during a portion of the coating process, the mere oscillation about the axis 17 being depended on for the distribution of the film of liquid on the surface of the form during the remainder of the process. In the manufacture of certain types of rubber goods, including very thin articles, it is preferred to turn the articles individually during the same time that they are collectively rotated about the axis 17. This is accomplished in the apparatus of Figs. 1 and 2 described above by moving the rack 30 slowly by hand while the shaft 17 and the forms supported thereon are mechanically rotated.

In the alternative modification shown in Fig. 4, the rotation of the forms about their individual axes is effected mechanically by providing one of the arms of the yoke 16 embracing the shaft 17 with bevel gear teeth 42 which may be an integral part of the yoke 16 or a separate gear fastened immovably thereto. The immediately adjacent counterweight supporting sleeve 43 is provided with an additional stud 44 parallel to the mold-supporting arms 19, 19. The stud 44 carries a freely revolving gear cluster 45, one end of which is fashioned as a bevel gear 46 meshing with the corresponding stationary gear 42, while the other end is made into a spur gear 47 of the same size as the gears 29, 29 on the mold supporting blocks 25, 25. The gear 47 meshes with the rack 30, consequently the molds 28, 28 are each constrained to rotate together with the gear cluster 45. The latter, however, meshing with the gear teeth 42, rotates a half revolution about its own axis each time that the shaft 17 turns a half revolution. If the forms 28, 28 are mounted with their palms away from the center of the machine as shown in Fig. 1 they would therefore execute a combined movement of rotation about two axes, the palms again being turned outward at the top of the movement.

If it is desired that the forms should execute a complete revolution about the axis 17, the rack 30 and the inner pair of mold-supporting arms 19, 19 may be omitted, the rack 23 and the stroke of the cylinder 15 being lengthened. The outer pair of mold-supporting arms 19, 19 will then meet no obstruction to a complete revolution, and can if desired be turned about their individual axes, either by hand, or mechanically, in a manner similar to that described above.

In certain dipping or coating operations in which the length of the object or form to be coated is considerably greater than its diameter, it is found that the primary rotation cannot be carried out with sufficient rapidity to effect a uniform distribution of the surface film before it begins to set, without increasing the peripheral speed of the form to such an extent that centrifugal force acting on the film would cause its displacement. In such cases, however, the diameter of the forms being comparatively small, the forms can undergo a comparatively rapid individual axial rotation without the centrifugal force becoming excessive. The forms may therefore be turned several revolutions about their individual (secondary) axes, at the same time that they are turned a single revolution or even a half revolution about their collective (primary) axis, and the liquid film may be distributed very rapidly and uniformly over the surface of the form. This is accomplished in the modification shown in Fig. 4 simply by changing the ratio of the bevel gears 42 and 46.

It is to be understood that the terms "horizontal" and "vertical" in the appended claims are employed to denote substantially or approximately these direction, for a considerable variation therefrom may be made without destroying the usefulness of the machine or the method. The term "form" is employed generically to indicate any object which is to be coated with rubber by a dipping process, either temporarily or permanently.

Although the operation of the machine has been described above with reference to a particular process of manufacturing rubber goods from latex by coagulation on a form, it is obviously not limited thereby, but may be employed generally in any such process, or even for the manufacture of similar goods from latex or rubber cements by successive dipping and drying of the forms. The invention is susceptible of numerous modifications without exceeding the spirit and scope of the invention as defined in the appended claims.

I claim:

1. A machine for manufacturing dipped rubber goods which comprises a form supported on a horizontal axis, means for turning the form about the horizontal axis, and a single vertical hydraulic cylinder about which the form may be rotated supporting the form, whereby the form may be lowered and raised into and from a plurality of coating baths in succession.

2. A machine for manufacturing dipped rubber goods which comprises a plurality of forms supported on a horizontal axis, a gear on the said axis, a hydraulically driven rack meshing with the gear whereby the forms are turned about the horizontal axis, and means for lowering and raising the form into and from a coating bath.

3. A machine for manufacturing dipped rubber goods which comprises a plurality of forms removably supported on a horizontal axis, a gear on the said axis, a hydraulically driven rack meshing with the gear whereby the forms are turned about the horizontal axis, and a single vertical hydraulic cylinder about which the forms may be rotated supporting the forms, whereby the forms may be lowered and raised into and from a plurality of coating baths in succession.

4. A machine for manufacturing dipped rubber goods which comprises a plurality of forms depending from a horizontal axis, a gear on the said axis, a hydraulically driven rack meshing with the gear whereby the forms are turned about the horizontal axis, means interconnecting the forms whereby they may be turned in unison about their individual axes perpendicular to the said horizontal axis.

5. A machine for manufacturing dipped rubber goods which comprises a plurality of forms, means removably supporting the forms in depending relation to a horizontal axis, a gear on the said axis, a hydraulically driven rack meshing with the gear whereby the forms are turned about the horizontal axis, means for automatically turning the forms about their individual axes perpendicular to the said horizontal axis during the rotational movement about the horizontal axis, and a single vertical hydraulic cylinder about which the forms may be rotated supporting the forms, whereby the forms may be lowered and raised into and from a plurality of coating baths in succession.

VERNON J. SPRUNGER.